O. F. & L. W. BEACH.
CONVERTIBLE WAGON BOX AND HAY RACK.
APPLICATION FILED JULY 24, 1912.
1,060,418.
Patented Apr. 29, 1913.
2 SHEETS—SHEET 1.
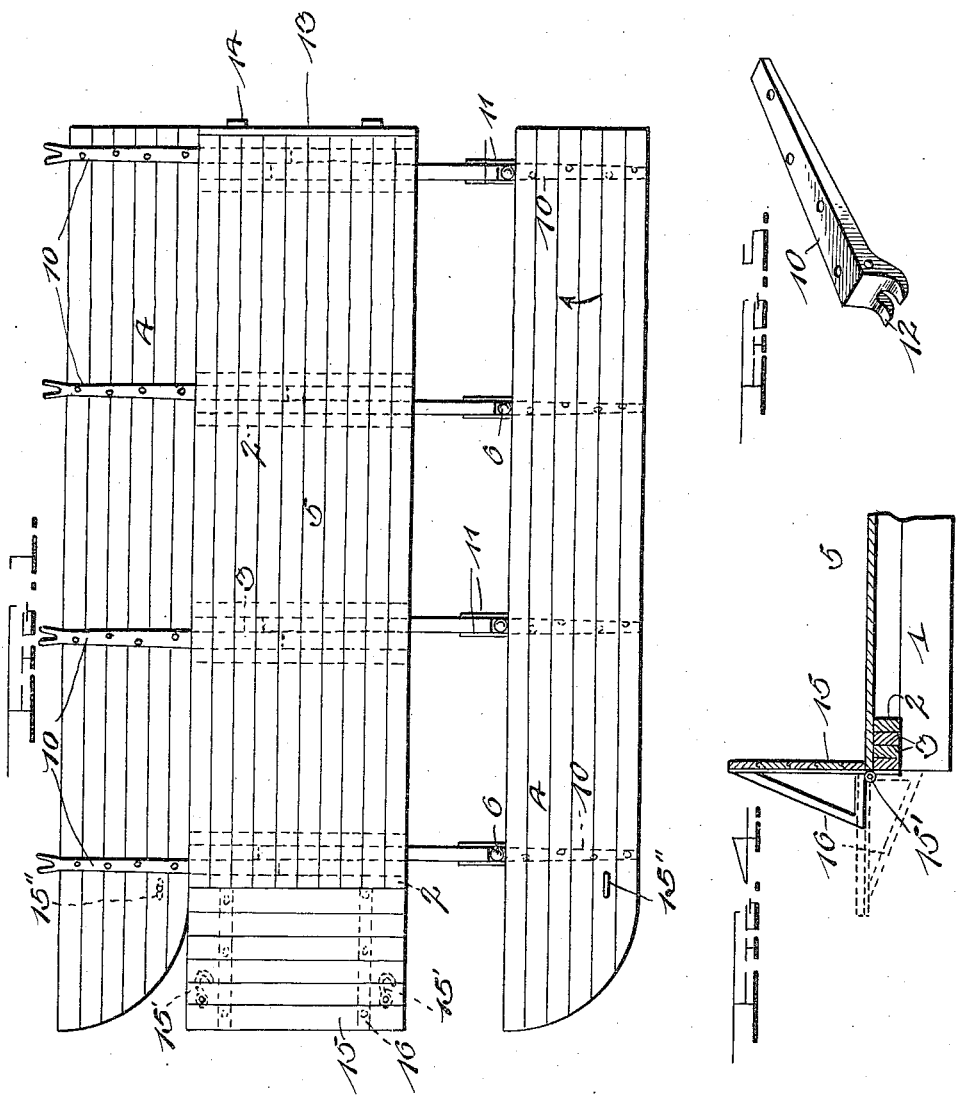
Witnesses
Chas. L. Griesbauer.
A. B. Norton.
Inventors
L. W. Beach and
O. F. Beach,
By Watson E. Coleman
Attorney

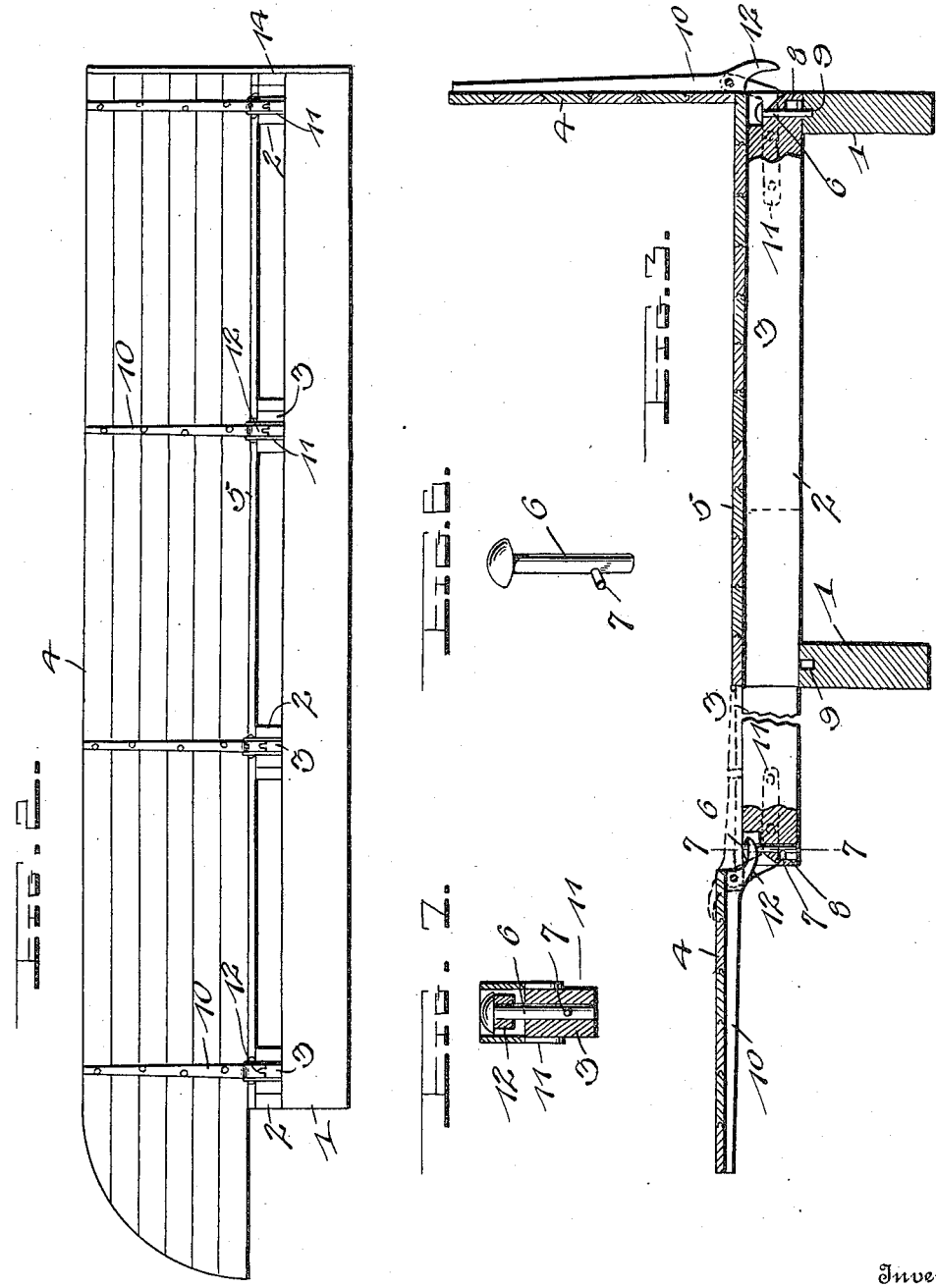

UNITED STATES PATENT OFFICE.

OLIVER F. BEACH AND LEWIS W. BEACH, OF BUCYRUS, OHIO.

CONVERTIBLE WAGON-BOX AND HAY-RACK.

1,060,418.

Specification of Letters Patent.   Patented Apr. 29, 1913.

Application filed July 24, 1912.   Serial No. 711,369.

*To all whom it may concern:*

Be it known that we, OLIVER F. BEACH and LEWIS W. BEACH, citizens of the United States, residing at Bucyrus, in the county of Crawford and State of Ohio, have invented certain new and useful Improvements in Convertible Wagon-Boxes and Hay-Racks, of which the following is a specification, reference being had to the accompanying drawings.

This invention relates to convertible wagon boxes and racks for hauling grain, hay or other materials, and the primary object of the present invention is to provide a wagon box whereby the sides and the rear end gate may be swung downwardly and held within the same plane as that of the bottom of the wagon box so that the same may be used for a hay rack.

A further object of the present invention is to provide a wagon box of the class aforesaid, whereby the sides thereof may be swung laterally and downwardly with relation to the bottom of the wagon box thereby increasing the holding capacity of the same when in use as a hay rack.

The present invention resides in superior advantages in points of simplicity, durability, and general efficiency, and one which will be readily converted to the use for which it is designed.

With the above and other objects in view, this invention consists of the novel details of construction, combination, formation and arrangement of parts as will be hereinafter more fully described and particularly pointed out in the appended claims.

In the accompanying drawings has been illustrated a simple and preferred form of the invention, it being, however, understood that no limitation is necessarily made to the precise structural details therein exhibited, but that the right is reserved to any changes, alterations and modifications to which recourse may be had within the scope of the invention without departing from the spirit or sacrificing the efficiency of the same.

In the said drawings, Figure 1 illustrates the plan view of the wagon box having one of its side members and rear end gate folded downwardly when in use as a hay rack, its opposite side member being extended laterally from the body of the wagon box and having an arrow placed thereon to indicate the direction in which the said side member is to turn in assuming the position similar to that of the opposite side member. Fig. 2 is a side elevation of the wagon box when the sides are in the vertical position; Fig. 3 is a transverse section illustrating one of the side members when in a vertical position and the opposite side member in an extended lateral position and showing the same in dotted lines when folded inwardly to form a hay rack; Fig. 4 is a detail section through the end of the wagon box showing the rear end gate in a vertical position in full lines and in a lowered position in dotted lines; Fig. 5 is a detail perspective view of one of the upright supporting stakes; Fig. 6 is a detail perspective view of one of the locking bolts, and Fig. 7 is a detail sectional view taken on the line 7—7 of Fig. 3.

Reference now being had to the accompanying drawings the main bed or frame of the wagon is composed, essentially of a pair of longitudinally extending sills 1 which are connected and spaced apart at suitable intervals by pairs of cross braces 2. These cross braces which are arranged in pairs are secured to the sills 1 by bolts or other suitable fastening means and each pair of cross braces have slidably mounted there between, a pair of parallel extending beams 3 which have hingedly secured to the outer ends thereof the sides 4 of the wagon box.

The bottom, side members, and end gates of the wagon body are preferably made of planking, as shown, and when the same are in use, the sills 1 are placed upon the bolsters of the wagon in the usual manner.

The bottom 5, of the wagon box is secured to the transversely extended cross braces 2 in any suitable manner and lies flush with the outer extremities thereof. When this structure is to be used as a wagon box the side members and rear end gate are held in raised position, but when the same is used as a hay rack the rear end gate is lowered to a position in the same plane with the bottom of the structure and the side members are then pulled laterally and then swung inwardly to lie upon the beams 3 as shown in Figs. 1 and 3 of the drawings.

The outer extremities of each of the sliding beams 3 are provided with a recess in which extends a locking bolt 6. These locking bolts are each provided with a lug extension 7 which is adapted to slide in a vertical groove 8 formed within the sliding beams 3 which will obviously prevent the withdrawal of the same. To provide means for holding the sliding beams 3 in an inward position and also to prevent the sides 4 of the body from being forced outwardly when articles have been placed within the wagon box, the sills 1 are provided in their upper face with recesses 9 in which the lower extremities of the locking bolt 6 are adapted to rest when the same are in an inward position. This will apparently prevent the movement of the sliding sills 3 until the bolt 6 has been raised from engagement with the notch 9.

It will be noted from Fig. 1 of the drawing that the sliding sills 3 are so arranged that they will rest upon the inner face of the cross braces 2, as shown, and which will obviously prevent any lateral movement of the said side members and at the same time allow the sills which extend from each side of the wagon box, to also freely slide within the tramways formed by these cross braces 2. The planking of the sides of the wagon box are secured to a plurality of vertically extending stakes 10 by bolts or other suitable means, and the lower extremity of each of these stakes 10 is hingedly connected to a pair of brace rods 11 secured on each side of the sliding beams 3. The lower extremities of the stakes 10 are each provided with an offset bifurcated portion 12 which is adapted to engage under the head of the locking bolts when the side members are in their lowered position which will obviously hold the bolts out of engagement with the sills 1 thereby permitting the beams 3 to be pulled outwardly. The forward end gate 13 is preferably held in a vertical stationary position by means of straps 14 as shown, but of course, this end gate may be detachably or hingedly secured as desired. The rear end gate 15 is hingedly secured as at 15' to the cross brace 2 as shown preferably in Fig. 4 of the drawing. This end gate has a triangular extending brace 16 extending from the rear face thereof, the shorter arm of which is adapted to rest against the outer face of the end cross brace 2, thereby providing means for holding the rear end gate in a horizontal plane when the same is used as a hay rack, but when the body is used as a wagon box, this end gate is raised in a vertical position and hooks 15' are secured upon the outer face of the rear end gate adjacent each end thereof and are adapted to be placed within eyebolts 15'' secured to the side members 4, thereby providing means for holding the side members and end gates in a vertical position.

What we claim is:—

1. In a wagon box, including a pair of longitudinally extending sills, cross pieces arranged in pairs upon said sills, beams slidable between said cross pieces, side members, vertically extending stakes secured thereto, means for hingedly securing the lower extremities of said stakes to said beams, means for engaging the lower extremity of said stake for holding said side members in a horizontal plane and means for locking said beams in an inward position, substantially as described.

2. A wagon box including a pair of longitudinally extending sills, cross pieces arranged in pairs upon said sills, beams slidably mounted between said cross pieces, side members pivotally mounted upon the outer extremities of said slidable beams, sliding bolts mounted within said beams and adapted to engage the said sills for holding the beams in an inward position, and means carried by said side members for lifting said bolts out of engagement with the sills, whereby the same may be adjusted laterally, substantially as described.

3. A wagon box including a pair of longitudinally extending sills, cross pieces arranged in pairs upon said sills, a pair of beams slidably mounted between each pair of cross pieces and adapted to extend from each side of the wagon box, side members hingedly connected to said slidable beams, means for holding said side members in a vertical position when the slidable beams are in an inward position between the cross pieces, and the said side members being adapted to rest upon the upper face of the beams when the same are in an extended position, substantially as and for the purpose specified.

4. A wagon body including a pair of longitudinally extending sills, cross pieces arranged in pairs on said sills, beams slidably mounted between said sills, brackets arranged upon the outer ends of said slidable beams, side members hingedly secured to said brackets, sliding bolts arranged adjacent the outer extremity of said beams and adapted to rest within recesses formed within said sills, means mounted upon said side members for releasing said bolts, and means for limiting the upward movement of said bolts, substantially as and for the purpose described.

In testimony whereof we hereunto affix our signatures in the presence of two witnesses.

OLIVER F. BEACH.
LEWIS W. BEACH.

Witnesses:
O. W. KENNEDY,
JOSEPHINE EDSINGER.